E. W. HENRY.
AUTOMATICALLY OPERATED FLOOD WATER RELEASING FLUME.
APPLICATION FILED OCT. 18, 1913.
1,113,341.
Patented Oct. 13, 1914.
2 SHEETS—SHEET 1.
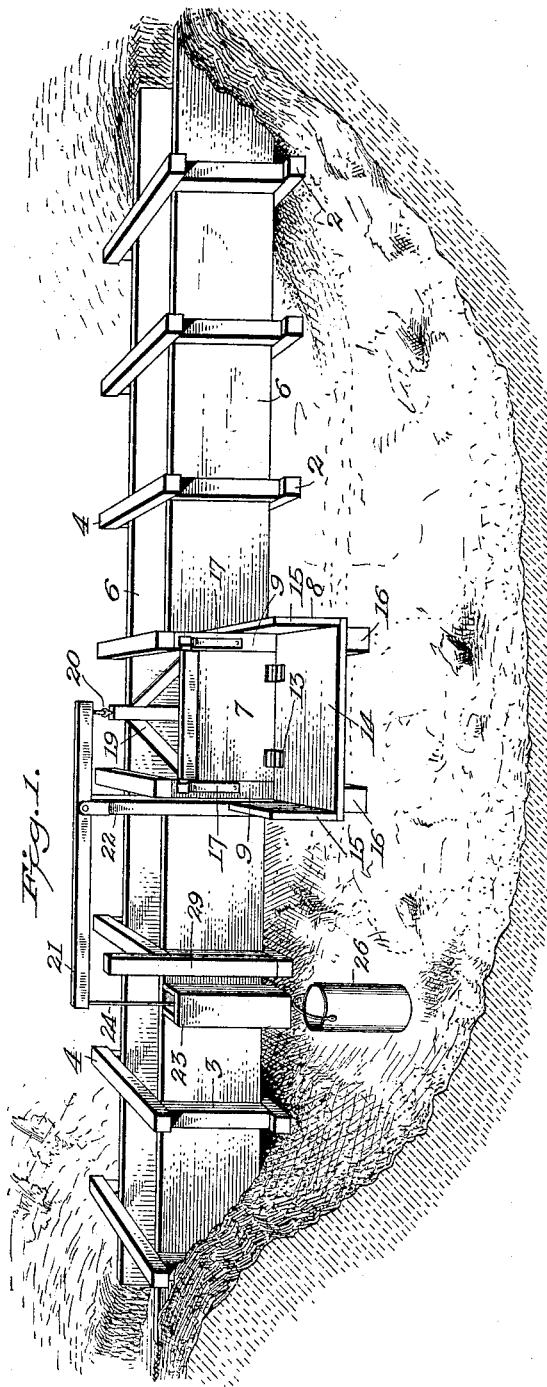

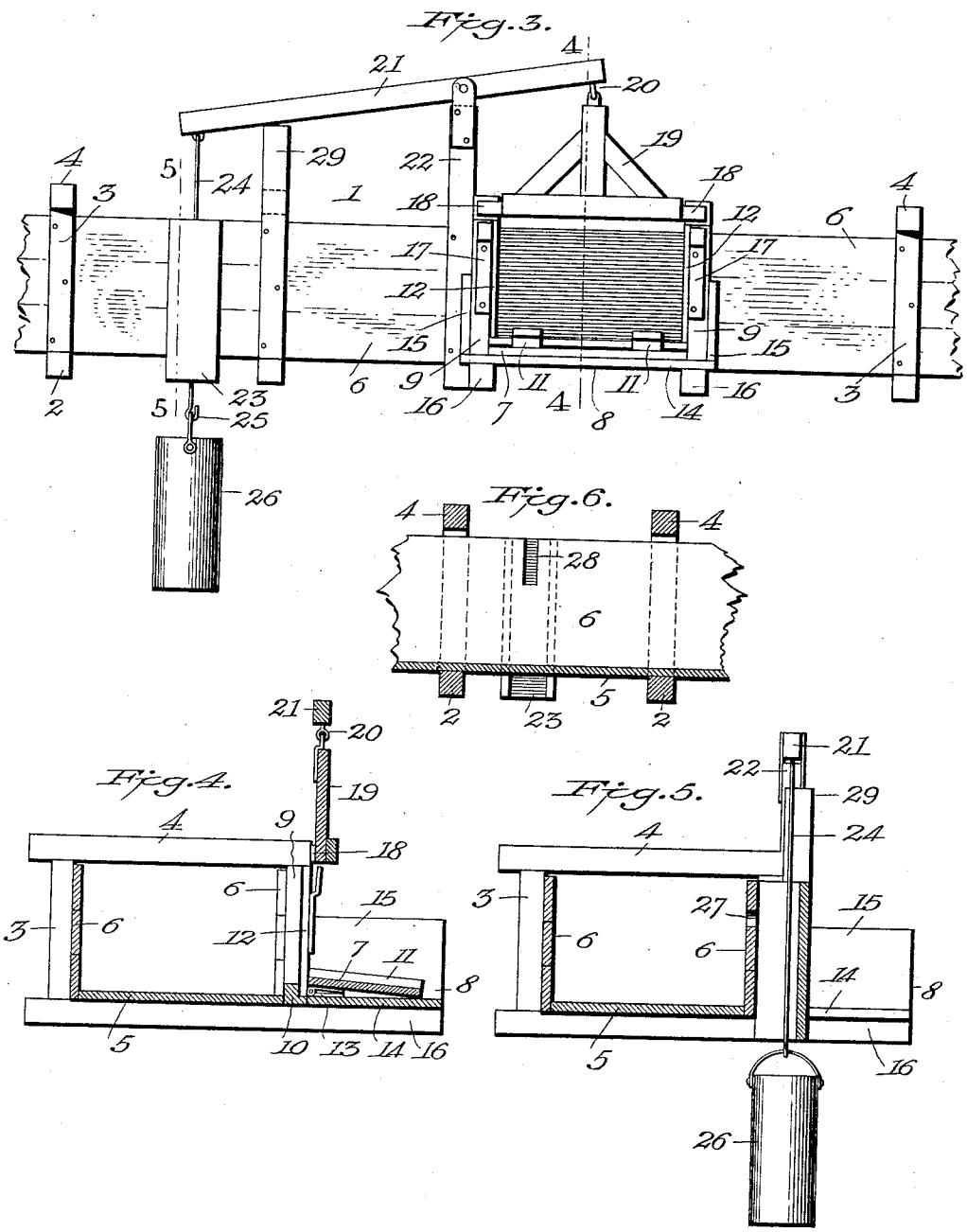

UNITED STATES PATENT OFFICE.

EDWARD W. HENRY, OF CORTEZ, COLORADO.

AUTOMATICALLY-OPERATED FLOOD-WATER-RELEASING FLUME.

1,113,341. Specification of Letters Patent. Patented Oct. 13, 1914.

Application filed October 18, 1913. Serial No. 795,938.

*To all whom it may concern:*

Be it known that I, EDWARD W. HENRY, a citizen of the United States of America, residing at Cortez, county of Montezuma, and State of Colorado, have invented a new and useful Automatically-Operated Flood-Water-Releasing Flume, of which the following is a specification.

My invention relates to a new automatically opening flood water releasing flume, and the objects of my invention are: First, to provide means in ditches and flumes carrying a predetermined steady flow of water, by which sudden flood or storm water entering and rushing through them in sufficient quantities to overflow them along their lengths, and thus wash away their banks or the adjacent ground and destroy them or other property, may be automatically discharged from flume portions forming a part of them and extending over natural drainage creeks, ravines, or draws, or other water escaping passageways occurring naturally or formed in the line of the ditch or flume, until after such sudden rush of storm and flood water has subsided to the naturally flowing capacity of said ditch or flume. And, second, to provide a flood water escaping gate and controlling means that will be automatically opened by any sudden flow of storm or flood water that flows into the ditch or flume in sufficient quantities to raise the height of the flow of water therein above its natural predetermined flowing level. I attain these objects by the mechanism illustrated in the accompanying drawings, in which:

Figure 1, is a perspective view of a flume provided with the improved automatically operated gate, the flume being shown as spanning a draw or ravine. Fig. 2, is a plan view of the flume, on a slightly enlarged scale. Fig. 3, is a side view of the flume, showing the gate down in position to release the water. Fig. 4, is a transverse sectional view on the line 4—4 of Fig. 3. Fig. 5, is a transverse sectional view on the line 5—5 of Fig. 3. And Fig. 6, is a fragmentary, longitudinal, vertical, sectional view illustrating a modification.

Similar letters of reference refer to similar parts throughout the several views.

Referring to the drawings, the numeral 1 designates a flume which as illustrated and described is constructed of wood, but which may if desired be constructed either partially or wholly of concrete or of structural iron, steel, or other suitable metal or material. As illustrated, my improved flume consists of the foundation sills 2, the side supporting and bracing studs 3, and the top tie beams 4, which extend across the top of the flume and tie the side braces together. The pieces 2, 3, and 4, are framed or joined together by any suitable means into square frames, and they are placed at short distances apart along the length of the flume, and support the plank floor 5 and sides 6, that form the body of the flume.

Flumes of the type my invention is applied to, are used to convey water from rivers and creeks for irrigation, placer mining, for the development of power, and for other purposes. They are used directly to convey water along the sides of rocky cliffs, where it is impractical to build ditches, and they are also used in ditches dug in the surface of the ground to cross gulches, ravines, and draws that lie in the path or line of the ditch. Flumes are almost always built with open tops and of a cross-area of sufficient capacity to carry or convey the amount of water required, but heavy rain storms and cloud-bursts sometimes suddenly swell the creeks and rivers far above the amount of their natural average flow from which ditches and flumes are taken, and during the flowing of the great amount of flood water over and above the natural flow of the creeks and rivers, a portion of it will flow into the ditches and flumes and overflow them and damage property below them, and in the case of ditches make breaks in them that soon allow the whole capacity of the ditch to flow across the country and destroy crops and property.

The essential object of my invention is to provide flumes with an automatically opening side gate that will permit the sudden rush of flood water flowing into and through flumes to escape into the wet or dry creeks, ravines, and draws the flumes cross in their course across the country in which they are built; and while there are many ways in which my invention may be carried into effect, I preferably carry out my invention in the following manner:

On one side of the flume, I construct a gate 7, and a spillway 8. The gate 7 is formed by cutting away one side of the flume between two side supporting posts 9, which are positioned at any desired predetermined distance apart that will give the size of discharge opening desired in the side of the flume, and the posts are positioned flush with the cut ends of the side planks, and between the posts and ends of the planks a sill 10 is fitted flush with the surface of the floor plank of the flume, that is a part of the floor of the flume. This water discharging opening in the side of the flume may be of any desired form. I preferably, however, make it long enough to allow the full carrying capacity of the flume to discharge through it, and I preferably extend this opening from the top edge of the flume to even with its floor portion, but if desired the opening may terminate a number of inches above the floor, by not cutting the side out entirely to the floor, in case it is desired to arrange it so that there would be some water flowing continuously through the flume when the gate was wide open. The gate 7 is composed of planks and braces 11, and is made enough larger than the opening in the side of the flume to permit its opposite ends to fit into rabbeted inner edges 12 of the corner posts 9, and the lower edge of the gate rests on the sill 10 and is hinged to the floor of the spillway by hinges 13, in such a manner as to allow the door to swing outwardly until it rests upon the spillway 8, which is built on the side of the flume to register with the water discharging opening, and which consists of the floor portion 14, the sides 15, and the supports 16. This spillway may be built of any length and be arranged as desired, and the gate 7 is arranged to swing outwardly into it. The posts 9 are provided with keepers 17, in which latch bars 18, secured to an automatically operating latch, are held, and are arranged to lock the gate in a releasable closed position, against the posts of the discharge opening in the flume.

The keepers 17 are preferably in the form of strips of strap iron, which are secured to the posts 8, flush with the rabbeted portions 12 thereof, the upper ends of the strips being offset as shown, to leave a space between the offset portions and the adjacent sides of the posts 9, to receive the latch bars 18, and the offset portions may incline outwardly from their lower ends, so as to cause the latch bars to crowd against the gate, and thus cause the gate to fit tightly against the posts 9, and thus form a practically watertight connection. The automatically operating latch comprises a triangular frame 19, to the horizontal member of which is secured the latch bars 18, which extend a sufficient distance beyond the ends of the said horizontal member to drop behind the offset portions of the keepers 17 when in gate-locking position.

To the apex of the latch 19, is secured, by a link connection 20, one end of a lever 21, which is fulcrumed to the upper end of a post 22, which is secured to the adjacent post 9, on one side of the gate opening. The opposite end of this lever terminates above a spout 23, in the form of a three sided trough, which is secured to the adjacent side of the flume, the side of the flume forming the remaining side of the spout. A rod 24, or other suitable connection, extends through this spout, and is connected at its upper end, to the end of the lever 21, while its lower end terminates in a hook 25, upon which is hung the bail of a suitable vessel 26. An aperture 27 in the side of the flume, opens into the spout 23, and this aperture is formed at a distance above the bottom of the flume which defines the highest normal level water is supposed to reach in passing through the flume. If, however, by reason of a cloud-burst or other causes, a flood should occur which would so increase the volume of water passing through the flume that its level would rise above the aperture 27, then water would flow through the said aperture and down through the spout 23, into the vessel 26, the weight of which, when empty, is not sufficient to overbalance the lever 21; but when the vessel becomes filled, its weight tilts the said lever 21, so that the latch 19 is lifted a distance sufficient to withdraw the latch bars 18, from the keepers 17, thus releasing the gate 7, which is swung outward on its hinges so as to lie against the bottom of the spillway, and as the spillway is always located above a gulch or ravine or draw, the water escaping from the flume is carried off by means of a natural water course, and thus the territory through which the ditch or water course passes, of which the flume is a part, is spared being flooded, as would otherwise be the result. After the flood has subsided, an attendant empties the vessel 26, closes the gate 7, and draws down the latch until the latch bars 18 drop behind the keepers 17, when the gate is held, the horizontal member of the latch resting against the upper portion of the said gate.

If desired, instead of the aperture 27, a slot 28 may be cut in the side of the flume, extending from the upper edge thereof to a point indicating the highest level to which the water should rise, as shown in Fig. 6.

To limit the gate releasing movement of the lever 21, a stop post 29 is secured to one of the side supporting studs 3, and this post extends up far enough to engage the lever 21, when it has dropped far enough to release the gate.

Having described my invention, what I claim as new and desire to secure by Letters Patent, is:

1. In a device of the character described, a flume having an aperture indicating a predetermined water level therein, and an opening in one side thereof, a gate for normally closing said opening, a latch for said gate, a lever attached at one end to said latch, and a vessel attached to the opposite end of said lever below and in line with said aperture, which is adapted to be filled when the water in said flume rises to the level of and flows through said aperture, whereby the lever is tilted to raise the latch and release the gate.

2. In a device of the character described, a flume having an aperture indicating the maximum water level therein, an opening in one side thereof, a hinged gate for normally closing said opening, keepers on the flume at opposite ends of the gate, a latch bar adapted to rest in said keepers and against said gate, a lever connected at one end to said latch bar, and a vessel suspended from the opposite end of said lever, below and in line with said aperture, which is adapted to be filled, when the water in said flume rises to the level of said aperture, thereby to tilt the lever by which the latch is raised and the gate released.

3. In a device of the character described, a flume having an outlet opening, and an aperture in one side at a point representing the maximum water level in said flume, a gate for normally closing said outlet opening, a latch for said gate, a lever, one end of which is connected to said latch, a vessel suspended from the opposite end of said lever, a spout extending from said aperture and positioned to discharge into said vessel, said vessel being filled when the water in said flume rises to the level of the said aperture, whereby the lever is tilted, which withdraws the latch and releases the gate.

4. In a device of the character described, a flume having an outlet, and an aperture in one side at a point representing the maximum water level in said flume, a vertical open-ended spout on said flume, in communication with said aperture, a gate for normally closing said outlet, a latch for said gate, a lever connected at one end to said latch, a connecting element extending through said spout and attached to the opposite end of said lever, a vessel attached to the lower end of said connecting element, and adapted to be filled when water in said flume rises to the level of said aperture, whereby the lever is tilted, which raises the latch and releases the gate, and means for supporting said gate, when the same is open.

5. In a device of the character described, a flume having an outlet, and an opening in one side at a point representing the maximum water level in said flume, a gate hinged at its lower edge to said flume for normally closing said outlet, a latch for said gate, a lever connected at one end to said latch, a rod depending from the opposite end of said lever, a vessel on the lower end of said rod, a spout on said flume surrounding said rod and communicating with said opening, said vessel being filled when the water in the flume rises to the level of the said opening, whereby the lever is tilted to raise the latch and release the gate, and a platform leading from said outlet which supports said gate when the same is open.

In testimony whereof I affix my signature in presence of two witnesses.

EDWARD W. HENRY.

Witnesses:
H. McEwen,
E. R. Mullen.